WILLIAM X. STEVENS.
Improvement in Chucks for Holding Drills.
No. 126,910.             Patented May 21, 1872.
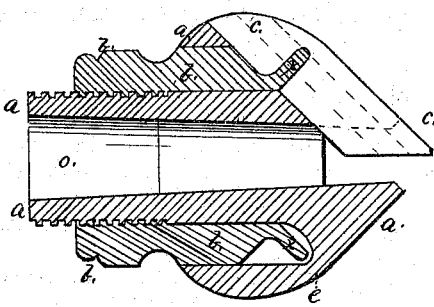
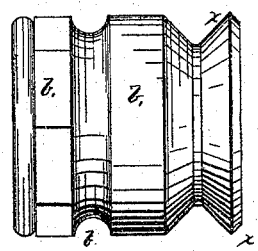 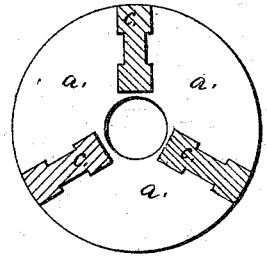
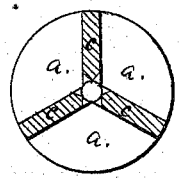 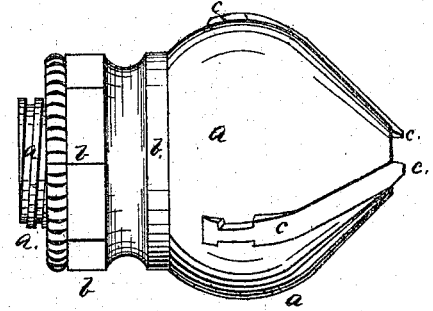 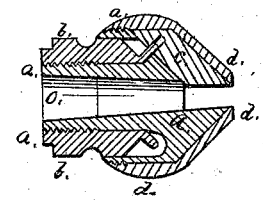
Witnesses
George Forbes
Lyman Doane
Inventor
W. X. Stevens 126,910

UNITED STATES PATENT OFFICE.

WILLIAM X. STEVENS, OF EAST BROOKFIELD, MASSACHUSETTS.

IMPROVEMENT IN CHUCKS FOR HOLDING DRILLS.

Specification forming part of Letters Patent No. 126,910, dated May 21, 1872.

Specification describing certain Improvements in Drill-Chucks, invented by WILLIAM X. STEVENS, of East Brookfield, in the county of Worcester and State of Massachusetts.

The first part of my invention relates to the construction, severally, and combination, herein described, of the body of a chuck, the movable jaws, and the flanged sleeves, in such a manner that said jaws may be held directly in the body of the chuck, the body being that part which is fastened to the mandrel of a lathe when in use; the object of this part of my invention being to hold the jaws more rigidly centrally than can be done in those chucks which hold the jaws in the piece which turns upon the mandrel. The second part of my invention relates to the construction and combination, severally, of the jaws, the shell, the body, and the flanged sleeve which actuates the jaws.

Figure 1 is a central longitudinal section of a chuck embodying my invention. Fig. 2 is a side elevation of the nut. Fig. 3 is a transverse section through $e\ e$ of Fig. 1. Fig. 4 is a side elevation of my chuck in full. Fig. 5 is an elevation showing that end of the chuck which is at the right hand in Fig. 4. Fig. 6 is the same as Fig. 1, with the addition of shell $d\ d\ d\ d$; Fig. 6 showing the nut drawn back and jaws open; Fig. 1 showing the nut forward and jaws closed.

A is the body of the chuck, which is suitably attached at hole $o$ upon the mandrel of the lathe, said body having longitudinal radial slots at its forward end to hold the jaws $c\ c$, and having an annular cavity formed around a hub at its rear end to receive the forward end of nut $b\ b$, said body $a\ a$ having a screw-thread on said hub, in which a corresponding internal screw-thread in nut $b\ b$ works. Within the radial grooves or body $a\ a$, Fig. 3, ribs project parallel to the edges of said grooves. Jaws $c\ c$ have corresponding slots to receive said ribs, and slide longitudinally upon them. Or, by another modification, jaws $c\ c$ are held in body $a\ a$, Fig. 5, by conical cap $d\ d$, Fig. 6, being screwed upon body $a\ a$. On the forward part of nut $b\ b$ a flange, $x\ x$, is made, preferably of the conical form here shown, a longitudinal section, Fig. 1, showing it to be at right angles to the sliding line of the jaws $c\ c\ c$, into which it enters in suitable grooves across said jaws.

In operation, the body $a\ a$ is fastened to the mandrel of the lathe; nut $b\ b$ is turned over toward you, thus screwing it back upon the hub of body $a\ a$, and drawing jaws $c\ c$ rearward by means of flange $x\ x$ working in aforesaid slots of jaws $c\ c$; and the guide-ways of jaws $c\ c$ being at a rearward angle with the axis of revolution, they move away from the axis as they draw back. After inserting the drill or piece to be held, turn the nut $b\ b$ over from you, and the reverse to the above-described motions tightens the jaws on the drill.

Annular screw-nut or sleeve $b$ may have its flange $x$ at any desired angle to carry out the principle of construction herein described.

I am aware that chucks similar to mine, and in which the jaws are acted upon in a combined linear and transverse direction by an annular flange turning in corresponding slots in said jaws, are old, as described in the patents of Edgar B. Beach, September 6, 1864; reissued November 14, 1865; and of John F. Thomas, October 18, 1870; and I do not therefore claim, broadly, the use of such flange and jaws; but What I do claim is—

1. The construction, severally, and the combination hererein described, of the body $a$, the flanged sleeve $b$, and the ribbed jaws $c$, substantially as shown and described.

2. The construction, severally, and the combination herein described, of body $a$, flanged sleeve $b$, jaws $c$, and shell $d$, substantially as shown and described.

WILLIAM X. STEVENS.

Witnesses:
GEORGE FORBES,
LYMAN DOANE.